US008583332B2

(12) United States Patent
Kanehama et al.

(10) Patent No.: US 8,583,332 B2
(45) Date of Patent: Nov. 12, 2013

(54) PRIME MOVER REVOLUTION SPEED CONTROL SYSTEM FOR HYDRAULIC CONSTRUCTION MACHINE

(75) Inventors: Mitsuhiko Kanehama, Kasumigaura (JP); Kensuke Sato, Ushiku (JP); Yasuo Okano, Kasumigaura (JP); Hiroyuki Azuma, Ushiku (JP); Tsuyoshi Nakamura, Tsuchiura (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 84 days.

(21) Appl. No.: 13/098,639

(22) Filed: May 2, 2011

(65) Prior Publication Data

US 2011/0276235 A1 Nov. 10, 2011

(30) Foreign Application Priority Data

May 6, 2010 (JP) ................................ 2010-106519

(51) Int. Cl.
*G06F 7/70* (2006.01)
*G05D 1/02* (2006.01)

(52) U.S. Cl.
USPC ............................................. 701/50; 37/348

(58) Field of Classification Search
USPC .......................... 701/50; 60/431, 426; 37/348
See application file for complete search history.

(56) References Cited

U.S. PATENT DOCUMENTS

| | | | | |
|---|---|---|---|---|
| 2006/0161324 | A1 | 7/2006 | Ozawa et al. | |
| 2006/0179690 | A1* | 8/2006 | Ikari | 37/348 |
| 2007/0204604 | A1 | 9/2007 | Naruse | |
| 2007/0213855 | A1* | 9/2007 | Furuno et al. | 700/83 |
| 2008/0245065 | A1* | 10/2008 | Nakamura et al. | 60/426 |
| 2009/0320461 | A1* | 12/2009 | Morinaga et al. | 60/431 |

FOREIGN PATENT DOCUMENTS

| | | | |
|---|---|---|---|
| JP | 5-140968 | A | 6/1993 |
| JP | 2905324 | B2 | 3/1999 |
| JP | 11-107322 | A | 4/1999 |
| JP | 2009-281149 | A | 12/2009 |

* cited by examiner

*Primary Examiner* — Tuan C. To
*Assistant Examiner* — Charles J Han
(74) *Attorney, Agent, or Firm* — Mattingly & Malur, PC

(57) ABSTRACT

A prime mover revolution speed control system for a hydraulic construction machine sets the revolution speed of the prime mover in accordance with the operating state invoked by an operating command and as a result of a determination of an excavation state so that that the revolution speed of the engine can be increased for a heavy load (speedup) in the excavation state. When the control lever is fully operated in the direction of arm crowding, the control lever 43 is also operated, and first judgment conditions are all met to conclude that an excavation state has begun. During excavation work, when the control lever 44 is subjected to a half or greater operation in the arm crowding direction, second judgment conditions are all met to conclude that the excavation state persists, and the speedup sequence is continued.

4 Claims, 6 Drawing Sheets

※FIRST JUDGMENT CONDITIONS

PD≧13.0[MPa] ∧ ARC≧2.5[MPa] ∧ ( BOU≧0.7[MPa] ∨BKC≧0.7[MPa] )

(FIRST THRESHOLD VALUE) (FULL OPERATION) (MINIMUM OPERATION)

※SECOND JUDGMENT CONDITIONS

PD≧10.0[MPa] ∧ ARC≧1.5[MPa]

(SECOND THRESHOLD VALUE) (HALF OPERATION)

PRIME MOVER REVOLUTION SPEED CONTROL SYSTEM FOR HYDRAULIC CONSTRUCTION MACHINE

BACKGROUND OF THE INVENTION

1. Field of the Invention

The present invention relates to a prime mover control system for a hydraulic construction machine. The invention more particularly relates to a prime mover revolution speed control system for a hydraulic excavator or other hydraulic construction machine that includes an engine as a prime mover and performs necessary work by driving a hydraulic actuator with hydraulic fluid discharged from a hydraulic pump rotationally driven by the engine.

2. Description of the Related Art

Hydraulic construction machines such as a hydraulic excavator generally include an engine as a prime mover. The engine rotationally drives at least one variable-displacement hydraulic pump. Hydraulic fluid discharged from the hydraulic pump drives a plurality of hydraulic actuators to perform excavation work or other necessary tasks. The hydraulic excavator includes a setup means for specifying a target revolution speed of the engine. A fuel injection amount is then controlled in accordance with the target revolution speed to provide revolution speed control.

The above-described revolution speed control system generally exercises control to provide a constant revolution speed. From the viewpoint of work efficiency enhancement and fuel consumption rate improvement, however, it may be preferable in some cases that the revolution speed of the prime mover be increased in accordance with load. In particular, when excavation work, which is likely to impose a heavy load, is performed, it is preferred that the revolution speed of the engine be higher than when a light load is imposed (speedup).

A revolution speed control system described, for instance, in Japanese Patent No. 2905324 includes operating state judgment means and prime mover revolution speed correction means. The operating state judgment means judges, in accordance with an operation of a control lever (existence of operation or absence of operation), the direction of control lever operation, and the pressure of the hydraulic pump, whether the current operating state needs an increase in the prime mover revolution speed. The prime mover revolution speed correction means increases the prime mover revolution speed by a predetermined value in accordance with the operating state determined by the operating state judgment means.

The operating state judgment means includes revolution speed correction maps A-C that are selected in accordance with detection results indicative of an operation of a control lever for each actuator (existence or absence) and the direction of control lever operation. When excavation work is performed, an arm crowding operation and a bucket crowding operation are detected. Then, the map C associated with the result of detection is selected. When the map C is selected, the engine revolution speed is first increased by 100 rpm without regard to the pump pressure. When the pump pressure exceeds 20 MPa (first threshold value), the engine revolution speed is gradually increased by up to 500 rpm. When the pump pressure drops below 17 MPa (second threshold value), the increase in the engine revolution speed is gradually decreased to 100 rpm.

SUMMARY OF THE INVENTION

However, the related art described above has the following problems.

When the hydraulic pump is used for excavation work, its pressure may greatly vary with an excavation target and an operator's operating procedure. If the hydraulic pump pressure varies outside the range between the first threshold value and the second threshold value during the use of the related art, a speedup sequence repeatedly begins and ends so that the operator feels uncomfortable with a machine operation. This results in decreased operational performance. The decrease in the operational performance disturbs the operator's concentration, thereby reducing the effect of work efficiency enhancement based on speedup.

When the related art is used, excavation work and non-excavation work are differentiated by setting the first and second threshold values. The first threshold value corresponds to the beginning of excavation work, whereas the second threshold value corresponds to the end of the excavation work. If the first and second threshold values are decreased without a grounded reason, unexpected speedup may occur during other work but excavation. As a precautionary measure, therefore, the first and second threshold values are set to be relatively high for safety assurance.

However, if the first and second threshold values are set to be unduly high, a speedup sequence begins in the middle of excavation work (speedup control does not readily start) and ends during excavation work (speedup control readily becomes ineffective). Consequently, the effect of work efficiency enhancement based on speedup cannot be fully obtained.

The present invention has been made in view of the above circumstances and provides a prime mover revolution speed control system that is used for a hydraulic construction machine and capable of identifying an excavation state with increased certainty to improve the operational performance during excavation work and enhance the work efficiency.

(1) In order to solve the above problems, according to one aspect of the present invention, there is provided a prime mover revolution speed control system for a hydraulic construction machine, the prime mover revolution speed control system including a prime mover, at least one variable-displacement hydraulic pump, a plurality of hydraulic actuators, a plurality of control valves, operating command means, operating command detection means, pump pressure detection means, standard target revolution speed setup means, target revolution speed correction means, and excavation state identification means. The hydraulic pump is driven by the prime mover. The hydraulic actuators are driven by hydraulic fluid of the hydraulic pump. The control valves control the flow rate and flow direction of the hydraulic fluid that is delivered from the hydraulic pump to the hydraulic actuators. The operating command means is provided for each of the hydraulic actuators to issue operating commands for the hydraulic actuators in accordance with the amount of operation in each operation direction by driving the control valves on an individual basis. The operating command detection means detects the operating commands of the operating command means. The pump pressure detection means detects the pressure of the hydraulic pump. The standard target revolution speed setup means sets a standard target revolution speed for the prime mover. The target revolution speed correction means acquires a target revolution speed for the prime mover by adding a predetermined correction value to the standard target revolution speed in accordance with an operating state invoked by the operating command means. The excavation state identification means judges, in accordance with the operation direction, the operation amount, and the pump pressure, whether an excavation state prevails. When the excavation state identification means concludes that an excavation state prevails, the target revolution speed correction means adds the predetermined correction value to the standard target revolution speed.

The related art causes the excavation state identification means to judge, in accordance with the operation direction, an operation performed or not (existence or absence), and the pump pressure, whether an excavation state prevails. On the other hand, the present invention causes the excavation state identification means to judge, in accordance with the operation direction, the operation amount, and the pump pressure, whether an excavation state prevails. This makes it possible to judge with increased certainty whether an excavation state prevails.

When the related art is used, relatively high threshold values (safety side values) are set for the pump pressure because the related art may not always be able to judge with certainty whether an excavation state prevails. On the other hand, the present invention identifies an excavation state with increased certainty. Therefore, the present invention makes it possible not only to assure safety, but also to set the threshold values for the pump pressure to be lower than when the related art is used.

When the related art is used, the threshold values for the pump pressure are set to be relatively high. Therefore, when the pump pressure varies outside the range between the threshold values, speedup and non-speedup sequences repeatedly occur to the detriment of operational performance. The present invention, on the other hand, sets low threshold values for the pump pressure. This provides speedup at all times and improves the operational performance.

When the related art is used, relatively high threshold values are set for the pump pressure. Therefore, the speedup sequence begins during excavation work and ends during excavation work. In other words, the range of speedup is narrow so that the effect of work efficiency enhancement based on speedup cannot be fully obtained. The present invention, on the other hand, sets low threshold values for the pump pressure. This ensures that the speedup sequence starts at the beginning of excavation work and terminates at the end of excavation work. Consequently, the range of speedup is wider than the related art so that improved work efficiency results.

(2) According to another aspect of the present invention, there is provided the prime mover revolution speed control system as described in (1) above, wherein, if, in a situation where the result of the last judgment does not indicate that an excavation state prevails, first judgment conditions are met as the pump pressure is a predetermined first threshold value or higher, an arm crowding operation amount is a value equivalent to a full operation or greater, and at least either a boom raising operation amount or a bucket crowding amount is a minimum operation amount or greater, the excavation state identification means concludes that the excavation state has begun; wherein, if the first judgment conditions are not met in a situation where the result of the last judgment does not indicate that the excavation state prevails, the excavation state identification means concludes that a non-excavation state has persisted; wherein, if, in a situation where the result of the last judgment indicates that the excavation state prevails, second judgment conditions are met as the pump pressure is a second threshold value or higher, which is lower that the first threshold value, and the arm crowding operation amount is a value equivalent to a half operation or greater, the excavation state identification means concludes that the excavation state has persisted; and wherein, if the second judgment conditions are not met in a situation where the result of the last judgment indicates that the excavation state prevails, the excavation state identification means concludes that the excavation state has terminated.

Consequently, the excavation state identification means included in the present invention is capable of judging with increased certainty whether the excavation state prevails.

As the present invention identifies an excavation state with increased certainty, it makes it possible to improve the operational performance during excavation work and enhance the work efficiency.

DESCRIPTION OF THE PREFERRED EMBODIMENTS

Constitution

An embodiment of the present invention will now be described with the accompanying drawings. In the embodiment described below, it is assumed that the present invention is applied to a hydraulic excavator.

Figure 1:
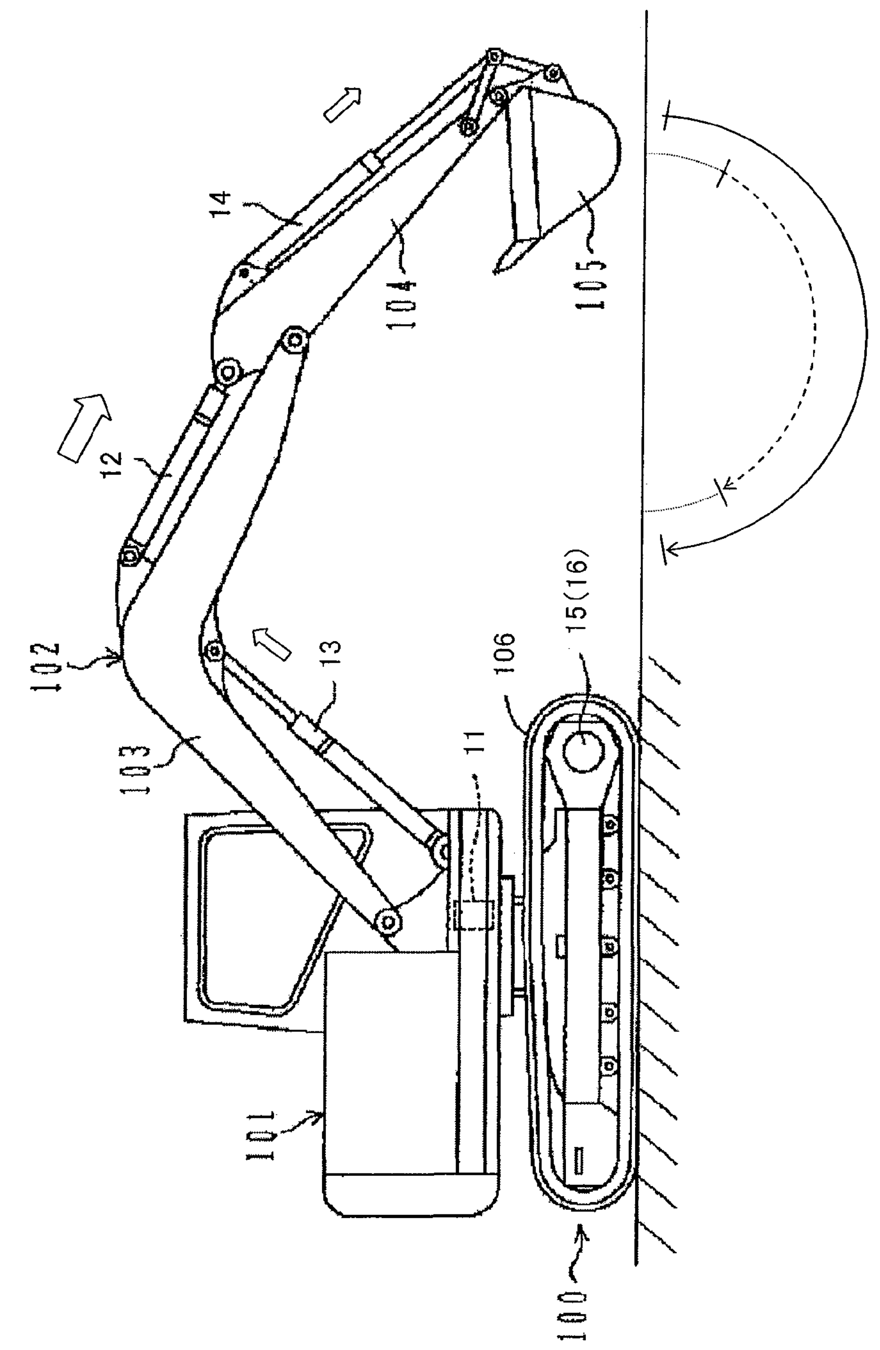
FIG. 1 is an external view of a hydraulic excavator.

FIG. 1 is an external view of the hydraulic excavator. The hydraulic excavator includes a lower travel structure 100, an upper swing structure 101, and a front work device 102. The lower travel structure 100 includes right- and left-hand travel motors 15, 16. The travel motors 15, 16 rotationally drive a crawler 106 so that the hydraulic excavator travels forward or backward. The upper swing structure 101 includes a swing motor 11. The swing motor 11 causes the upper swing structure 101 to swing clockwise or counterclockwise relative to the lower travel structure 100. The front work device 102 includes a boom 103, an arm 104, and a bucket 105. The boom 103 is moved up and down by a boom cylinder 13. The arm 104 is operated toward a dumping position (opening position) or a crowding position (scooping position) by an arm cylinder 12. The bucket 105 is operated toward the dumping or crowding position by a bucket cylinder 14.

Figure 2:
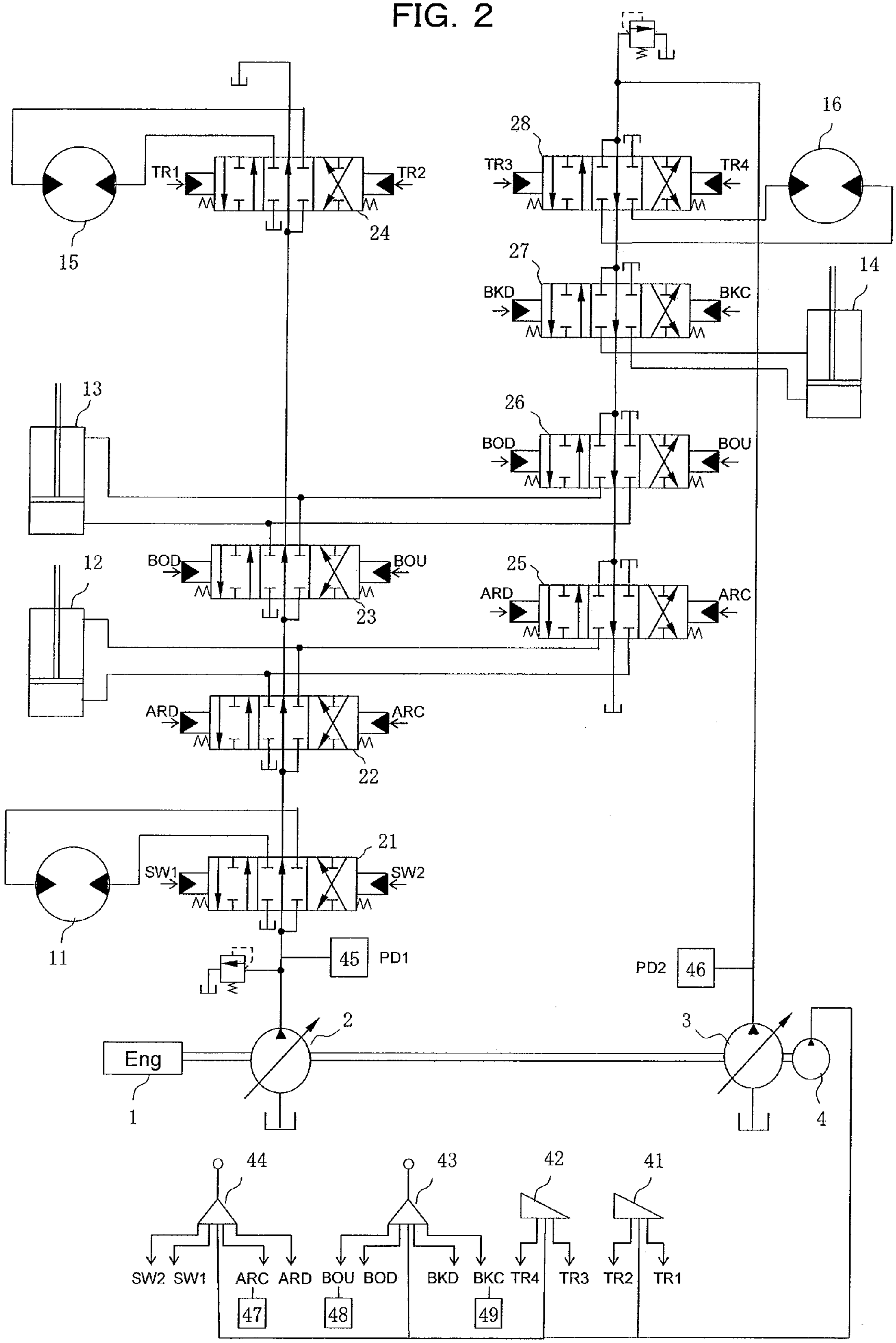
FIG. 2 is a schematic diagram illustrating a hydraulic system for the hydraulic excavator.

FIG. 2 is a schematic diagram illustrating a hydraulic system for the hydraulic excavator. The hydraulic system includes an engine 1, variable-displacement hydraulic pumps 2, 3, a pilot pump 4, a plurality of hydraulic actuators 11-16, a plurality of control valves 21-28, and operating command devices 41-44. The variable-displacement hydraulic pumps 2, 3 are driven by the engine 1. The hydraulic actuators 11-16 are driven by hydraulic fluid of the hydraulic pumps 2, 3. The control valves 21-28 control the flow rate and flow direction of the hydraulic fluid that is supplied from the hydraulic pumps 2, 3 to the hydraulic actuators 11-16. The operating command devices 41-44 are provided for the hydraulic actuators 11-16 to issue operating commands to the hydraulic actuators 11-16 in accordance with the amount of operation in each operation direction by driving the control valves 21-28 with the hydraulic fluid of the pilot pump 4.

The actuator 11 is a swing hydraulic motor (swing motor). The actuator 12 is an arm hydraulic cylinder (arm cylinder). The actuator 13 is a boom hydraulic cylinder (boom cylinder). The actuator 14 is a bucket hydraulic cylinder (bucket cylinder). The actuator 15 is a left-hand travel hydraulic motor (left-hand travel motor). The actuator 16 is a right-hand travel hydraulic motor (right-hand travel motor).

The control valves 21-24 are positioned on a center bypass line that is connected to the hydraulic pump 2. The control valve 21 is for the swing motor 11. The control valve 22 is for the arm cylinder 12. The control valve 23 is for the boom cylinder 13. The control valve 24 is for the left-hand travel motor 15. The control valves 25-28 are positioned on a center bypass line that is connected to the hydraulic pump 3. The control valve 25 is for the arm cylinder 12. The control valve 26 is for the boom cylinder 13. The control valve 27 is for the bucket cylinder 14. The control valve 28 is for the right-hand travel motor 16.

The arm cylinder 12 is provided with two control valves 22, 25. The boom cylinder 13 is also provided with two control valves 23, 26. Hydraulic fluid flows from the two hydraulic pumps 2, 3 can converge for supply purposes.

The operating command device 41 is a left-hand travel control pedal. Operating pilot pressures TR1, TR2 are generated in accordance with the operation direction and operation amount of the control pedal 41 to provide switching control of the control valve 24. The operating command device 42 is a right-hand travel control pedal. Operating pilot pressures TR3, TR4 are generated in accordance with the operation direction and operation amount of the control pedal 42 to provide switching control of the control valve 28. The operating command device 43 is a control lever for both the boom and bucket. Operating pilot pressures BOD, BOU are generated in accordance with one operation direction and the operation amount of the control lever 43 to provide switching control of the control valves 23, 26. Operating pilot pressures BKD, BKC are generated in accordance with the other operation direction and the operation amount of the control lever 43 to provide switching control of the control valve 27. The operating command device 44 is a control lever for both the arm and swing. Operating pilot pressures ARD, ARC are generated in accordance with one operation direction and the operation amount of the control lever 44 to provide switching control of the control valves 22, 25. Operating pilot pressures SW1, SW2 are generated in accordance with the other operation direction and the operation amount of the control lever 44 to provide switching control of the control valve 21.

The hydraulic system includes pressure sensors that detect various pressures. For the sake of explanation, FIG. 2 shows pressure sensors 45-49. The pressure sensor 45 detects the discharge pressure PD1 of the hydraulic pump 2. The pressure sensor 46 detects the discharge pressure PD2 of the hydraulic pump 3. The pressure sensor 47 detects the operating pilot pressure ARC, which corresponds to an arm crowding operation amount. The pressure sensor 48 detects the operating pilot pressure BOU, which corresponds to a boom raising operation amount. The pressure sensor 49 detects the operating pilot pressure BKC, which corresponds to a bucket crowding operation amount.

Figure 3:
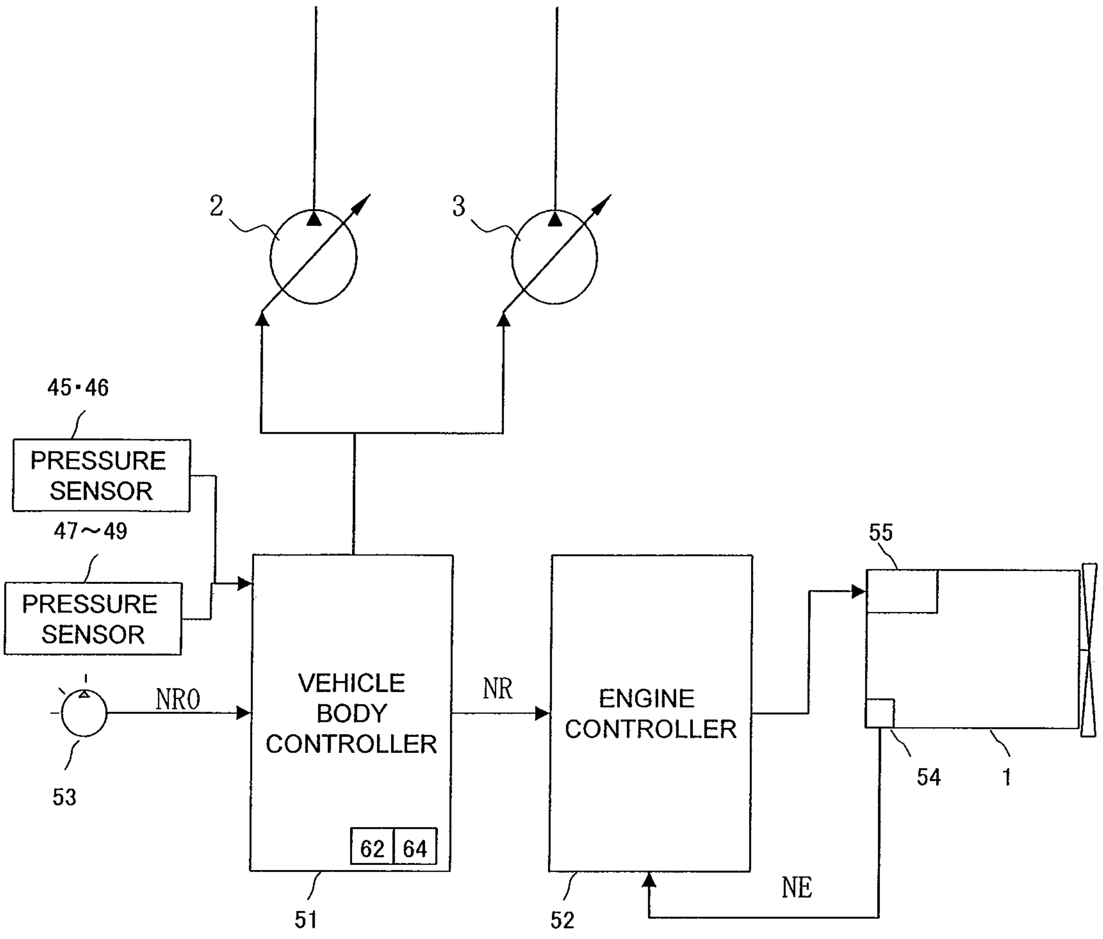
FIG. 3 is a conceptual diagram illustrating a control system that controls an engine and the hydraulic system.

FIG. 3 is a conceptual diagram illustrating a control system that controls the engine and the hydraulic system. The control system includes a vehicle body controller 51 and an engine controller 52.

The vehicle body controller 51 provides electronic control of the hydraulic system for the hydraulic excavator. For example, the vehicle body controller 51 detects the operation amounts of the operating command devices 41-44 through the pressure sensors 47-49, and provides tilt control of the hydraulic pumps 2, 3 to ensure that their discharge flow rates correspond to the detected operation amounts. Further, the vehicle body controller 51 computes a target revolution speed NR of the engine 1 in accordance, for instance, with a command signal from an engine control dial 53, and outputs the computed target revolution speed NR to the engine controller 52.

The engine controller 52 inputs an actual revolution speed NE from a revolution speed sensor 54, which is included in the engine 1 to detect the actual revolution speed NE of the engine 1, and outputs a fuel injection command to an electronic governor 55 in the engine 1 so that the actual revolution speed NE remains equal to the target revolution speed NR.

An excavation state identification function 62 and a target revolution speed correction function 64, which are peculiar to a prime mover revolution speed control system according to the present embodiment, are parts of processing functions of the vehicle body controller 51.

Control

The vehicle body controller 51 has a standard target revolution speed setup function 61, a correction value setup function 63, and a processing function for a pump pressure filter 65 in addition to the excavation state identification function 62 and the target revolution speed correction function 64.

Figure 4:
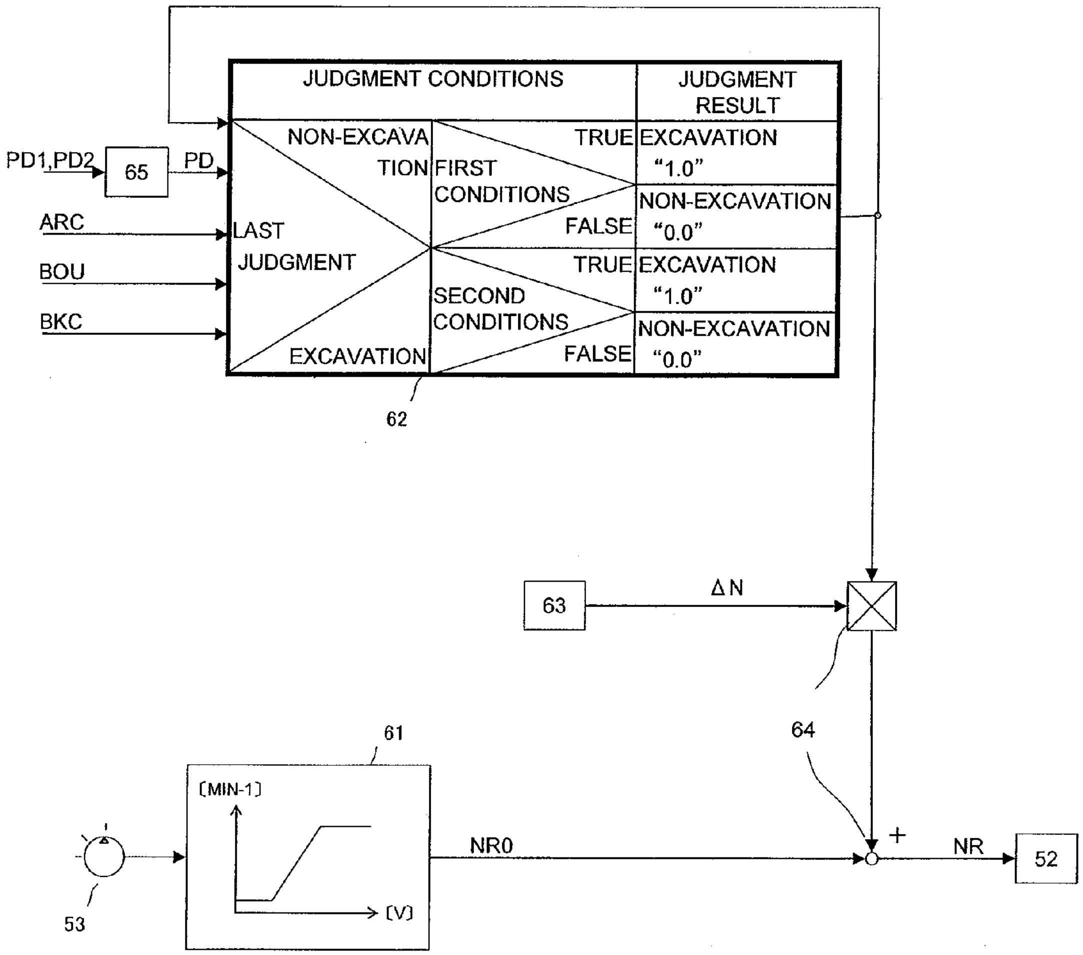
FIG. 4 is a functional block diagram illustrating an excavation state identification function, a target revolution speed correction function, and subordinate processing functions.

FIG. 4 is a functional block diagram illustrating the excavation state identification function 62, the target revolution speed correction function 64, and subordinate processing functions.

The standard target revolution speed setup function 61 computes a standard target revolution speed NR0 of the engine 1 in accordance with a command signal from the engine control dial 53. The relationship between the command signal from the engine control dial 53 and the standard target revolution speed NR0 of the engine 1 is predefined so that the standard target revolution speed NR0 increases with an increase in the command signal (voltage) from the engine control dial 53.

In accordance with the operation directions and operation amounts of the operating command devices 41-44 and the pump pressures of the hydraulic pumps 2, 3, the excavation state identification function 62 judges whether an excavation state prevails. If the result of judgment indicates that an excavation state prevails, the excavation state identification function 62 outputs a coefficient of 1.0. If, on the other hand, the judgment result does not indicate that an excavation state prevails, the excavation state identification function 62 outputs a coefficient of 0.0. Further, the excavation state identification function 62 outputs the judgment result to itself. Details of excavation state identification will be described later.

The correction value setup function 63 presets a correction value ΔN. For the sake of explanation, the present embodiment assumes that the correction value ΔN remains unchanged. However, the correction value ΔN may vary with the pump pressures of the hydraulic pumps 2, 3.

The target revolution speed correction function 64 multiplies the correction value ΔN, which is preset by the correction value setup function 63, by the coefficient output from the excavation state identification function 62, adds the resulting value to the standard target revolution speed NR0, which is computed by the standard target revolution speed setup function 61, to determine the target revolution speed NR, and outputs the determined target revolution speed NR to the engine controller 52.

The details of excavation state identification by the excavation state identification function 62 will now be described.

The excavation state identification function 62 inputs the result of the last judgment from itself. Further, the excavation state identification function 62 inputs the discharge pressure PD1 of the hydraulic pump 2 from the pressure sensor 45, inputs the discharge pressure PD2 of the hydraulic pump 3 from the pressure sensor 46, and regards the average of the discharge pressure PD1 and discharge pressure PD2 as a pump pressure PD. The pump pressure PD is filtered by a filter 65 to cancel the influence of a pump surge pressure generated at startup. This makes it possible to avoid an unnecessary increase in the engine revolution speed. The excavation state identification function 62 inputs the operating pilot pressure ARC, which corresponds to the arm crowding operation amount, from the pressure sensor 47, the operating pilot pressure BOU, which corresponds to the boom raising operation amount, from the pressure sensor 48, and the operating pilot pressure BKC, which corresponds to the bucket crowding operation amount, from the pressure sensor 49.

If, in a situation where the result of the last judgment does not indicate that an excavation state prevails, first judgment conditions are met as the pump pressure PD is a predetermined first threshold value (13 MPa) or higher, the arm crowding operation amount ARC is full (2.5 MPa) or greater, and at least either the boom raising operation amount BOU or the bucket crowding operation amount BKC is a value corresponding to an operated state (the operated state corresponds to a minimum operation amount, for example, 0.7 MPa, at which a boom raising operation or a bucket crowding operation is started by operating a control lever) or greater, it is concluded that an excavation state prevails (an excavation state has begun).

If, in a situation where the result of the last judgment does not indicate that an excavation state prevails, at least one of the first judgment conditions is not met, that is, if the pump pressure PD is lower than the predetermined first threshold value (13 MPa), the arm crowding operation amount ARC is lower than a value (2.5 MPa) equivalent to a full operation, or at least either the boom raising operation amount BOU or the bucket crowding operation amount BKC is lower than the minimum operation amount (0.7 MPa), it is concluded that an excavation state does not prevail (a non-excavation state has persisted).

If, in a situation where the result of the last judgment indicates that an excavation state prevails, second judgment conditions are met as the pump pressure PD is a second threshold value (10 MPa) or higher and the arm crowding operation amount ARC is a value (1.5 MPa) equivalent to a half operation or higher, it is concluded that an excavation state prevails (an excavation state has persisted).

If, in a situation where the result of the last judgment indicates that an excavation state prevails, at least one of the second judgment conditions is not met, that is, if the pump pressure PD is lower than the second threshold value (10 MPa) and the arm crowding operation amount ARC is lower than a value (1.5 MPa) equivalent to a half operation, it is concluded that an excavation state does not prevail (an excavation state has terminated).

Correspondence with Claims

The control pedals 41, 42 and control levers 43, 44, which are provided respectively for the hydraulic actuators 11-16, constitute operating command means, which issues operating commands for the hydraulic actuators 11-16 in accordance with the amount of operation in each operation direction by driving the control valves 21-28 on an individual basis. The pressure sensors 47, 48 constitute operating command detection means, which detects the operating commands of the control levers 43, 44. The pressure sensors 45, 46 constitute pump pressure detection means, which detects the pressures of the hydraulic pumps 2, 3.

The engine control dial 53 and the standard target revolution speed setup function 61 constitute standard target revolution speed setup means, which sets the standard target revolution speed NR0 for the engine 1. The excavation state identification function 62 constitutes excavation state identification means, which judges, in accordance with the arm crowding operation amount ARC, the boom raising operation amount BOU, the bucket crowding operation amount BKC, and the pump pressure PD, whether an excavation state prevails. The correction value setup function 63 and the target revolution speed correction function 64 constitute target revolution speed correction means, which obtains the target revolution speed NR for the engine 1 by adding the correction value ΔN to the standard target revolution speed NR0 when the excavation state identification function 62 concludes that an excavation state prevails.

Operation

An excavation operation performed by the prime mover revolution speed control system according to the present embodiment will now be described.

Before the start of excavation work, the control levers 43, 44 are not operated, the pump pressure PD is minimized, and none of the first judgment conditions are met. Thus, the excavation state identification function 62 concludes that an excavation state does not prevail, and outputs a coefficient of 0.0. The target revolution speed correction function 64 sets the standard target revolution speed NR0 as the target revolution speed NR. Obviously, the prime mover revolution speed control system does not provide speedup.

When an operator intends to initiate excavation work and operates the control lever 44 in the direction of arm crowding, the arm cylinder 12 extends to turn the arm 104 in the arm crowding direction (see FIG. 1). In this instance, the control lever 44 is fully operated so that the operating pilot pressure ARC, which corresponds to the arm crowding operation amount, is 2.5 MPa or higher. The procedure for starting the excavation work involves a combined operation of arm crowding and boom raising or a combined operation of arm crowding and bucket crowding (see FIG. 1). Therefore, the control lever 43 is also operated so that either the boom raising operation amount BOU or the bucket crowding operation amount BKC is 0.7 MPa or higher.

Meanwhile, when the arm 104 merely turns in the air, no heavy load is generated so that the pump pressure PD remains below 13 MPa. Therefore, the first judgment conditions are not met. Consequently, the excavation state identification function 62 concludes that a non-excavation state has persisted, and outputs a coefficient of 0.0. The target revolution speed correction function 64 sets the standard target revolution speed NR0 as the target revolution speed NR. The prime mover revolution speed control system does not provide speedup.

When the arm 104 turns to let the bucket 105 catch an excavation target, load is generated to increase the pump pressure PD. When the pump pressure PD increases to 13 MPa or higher, all the first judgment conditions are met. The excavation state identification function 62 then concludes that an excavation state has begun, and outputs a coefficient of 1.0. The target revolution speed correction function 64 determines the target revolution speed NR by adding the correction value ΔN to the standard target revolution speed NR0. In other words, the prime mover revolution speed control system initiates a speedup sequence.

When the excavation work is continuously performed, the load persists so that the pump pressure PD seldom drops below 10 MPa. In most cases, the control lever 44 is subjected to a half or greater operation so that the operating pilot pressure ARC corresponding to the arm crowding operation amount is 1.5 MPa or higher. Therefore, all the second judgment conditions are met. Consequently, the excavation state identification function 62 concludes that an excavation state has persisted, and outputs a coefficient of 1.0. The target revolution speed correction function 64 determines the target revolution speed NR by adding the correction value ΔN to the standard target revolution speed NR0. In other words, the prime mover revolution speed control system continues with the speedup sequence.

The operation performed during continued excavation work is not always a combined operation of arm crowding and boom raising or a combined operation of arm crowding and bucket crowding. Therefore, the boom raising operation amount BOU and bucket crowding operation amount BKC are not the factors of the second judgment conditions.

When the excavation target has almost been excavated and the load is reduced so that the pump pressure PD drops below 10 MPa, the second judgment conditions are not met. Therefore, the excavation state identification function 62 concludes that the excavation state has terminated, and outputs a coefficient of 0.0. The target revolution speed correction function 64 sets the standard target revolution speed NR0 as the target revolution speed NR. The prime mover revolution speed control system terminates the speedup sequence.

If the operator intends to halt the excavation work during excavation and operates the control lever 44 by less than the half amount, the operating pilot pressure ARC corresponding to the arm crowding operation amount drops below 1.5 MPa. As a result, the second judgment conditions are not met. Therefore, the excavation state identification function 62 concludes that the excavation state has terminated, and outputs a coefficient of 0.0. The target revolution speed correction function 64 sets the standard target revolution speed NR0 as the target revolution speed NR. The prime mover revolution speed control system terminates the speedup sequence.

As described above, the prime mover revolution speed control system initiates the speedup sequence at the beginning of excavation and terminates the speedup sequence at the end of excavation.

Other operations but excavation performed by the prime mover revolution speed control system according to the present embodiment will now be described.

As is the case with excavation work, aerial work (suspending) and leveling work may also be a combined operation of arm crowding and boom raising or a combined operation of arm crowding and bucket crowding. When the control lever 44 is fully operated, the operating pilot pressure ARC corresponding to the arm crowding operation amount is 2.5 MPa or higher. Further, when the control lever 43 is operated as well, the boom raising operation amount BOU or the bucket crowding operation amount BKC is 0.7 MPa or higher.

Meanwhile, the aerial work (suspending) and leveling work do not incur heavy load so that the pump pressure PD remains lower than 13 MPa. Therefore, the first judgment conditions are not met. Consequently, the excavation state identification function 62 concludes that the non-excavation state has persisted, and outputs a coefficient of 0.0. The target revolution speed correction function 64 sets the standard target revolution speed NR0 as the target revolution speed NR. The prime mover revolution speed control system does not provide speedup.

Advantage

Advantages of the present embodiment will now be described in comparison with those of the related art.

The revolution speed control system according to the related art includes the operating state judgment means and the prime mover revolution speed correction means. The operating state judgment means judges, in accordance with the operation of the control lever (existence of operation or absence of operation), the direction of control lever operation, and the pressure of the hydraulic pump, whether the current operating state needs an increase in the prime mover revolution speed. The prime mover revolution speed correction means increases the prime mover revolution speed by the predetermined value in accordance with the operating state determined by the operating state judgment means. The operating state judgment means includes the revolution speed correction maps that are selected in accordance with detection results indicative of the operation of the control lever for each actuator (existence or absence) and the direction of control lever operation. When excavation work is performed, an arm crowding operation and a bucket crowding operation are detected. Then, the map corresponding to the result of detection is selected. In accordance with the selected map, the prime mover revolution speed control system initiates a speedup sequence when the pump pressure rises to the first threshold value (20 MPa) or higher, and terminates the speedup sequence when the pump pressure drops below the second threshold value (17 MPa). The first and second threshold values are defined so as to distinguish between excavation work and non-excavation work. If the first and second threshold values are decreased without a grounded reason, unexpected speedup may occur during non-excavation work. As a precautionary measure, therefore, the first and second threshold values are set to be relatively high for safety assurance.

Figure 5A:
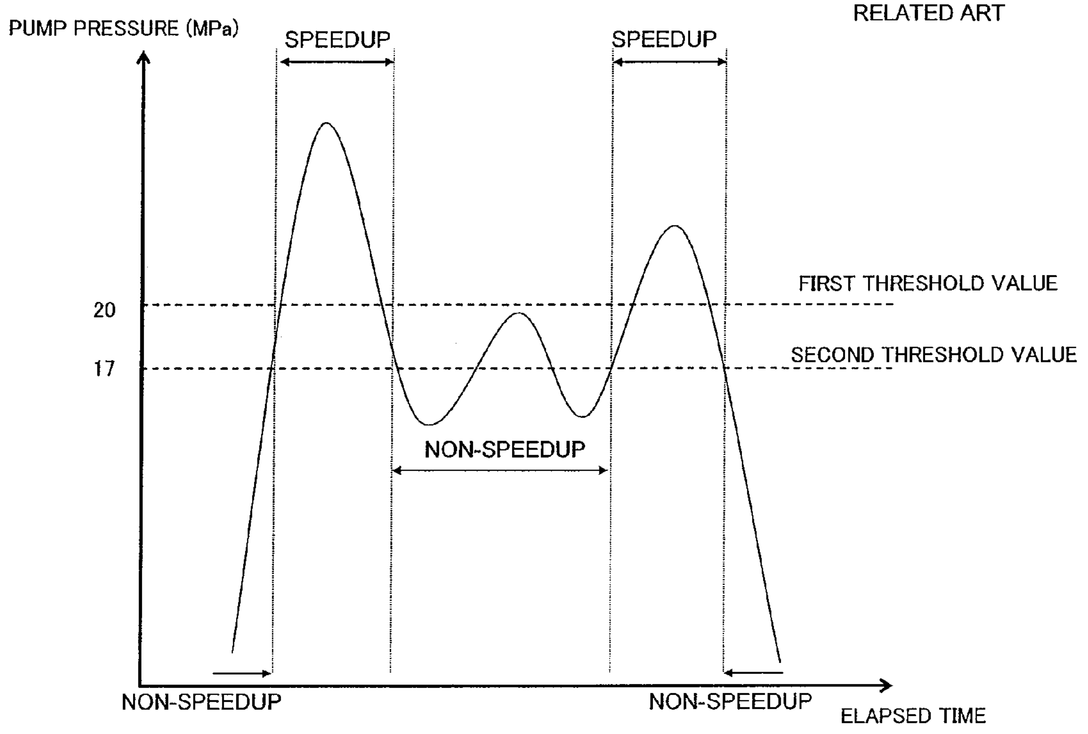
FIG. 5A is a diagram illustrating the relationship between pump pressure changes PD and speedup that prevails during the use of the related art.

FIG. 5A is a diagram illustrating the relationship between speedup and changes in the pump pressure PD that prevails during the use of the related art. The horizontal axis indicates elapsed time and the vertical axis indicates the pump pressure PD. During excavation work, the pump pressure PD may greatly vary with the excavation target and the procedure performed by the operator. If the pump pressure varies outside the range between the first threshold value and the second threshold value, the speedup sequence repeatedly begins and ends. The speedup sequence followed when the pump pressure PD varies as indicated in FIG. 5A will be described below. When the pump pressure PD is lower than 20 MPa, the non-speedup sequence is followed. The speedup sequence begins when the pump pressure PD is 20 MPa or higher, and terminates when the pump pressure PD is lower than 17 MPa. After the non-speedup sequence is followed for a while, the speedup sequence begins again and then terminates.

When the above-described speedup sequence is followed, the operator feels uncomfortable with a machine operation. This results in decreased operational performance. The decrease in the operational performance disturbs the operator's concentration, thereby reducing the effect of work efficiency enhancement based on speedup.

Figure 5B:
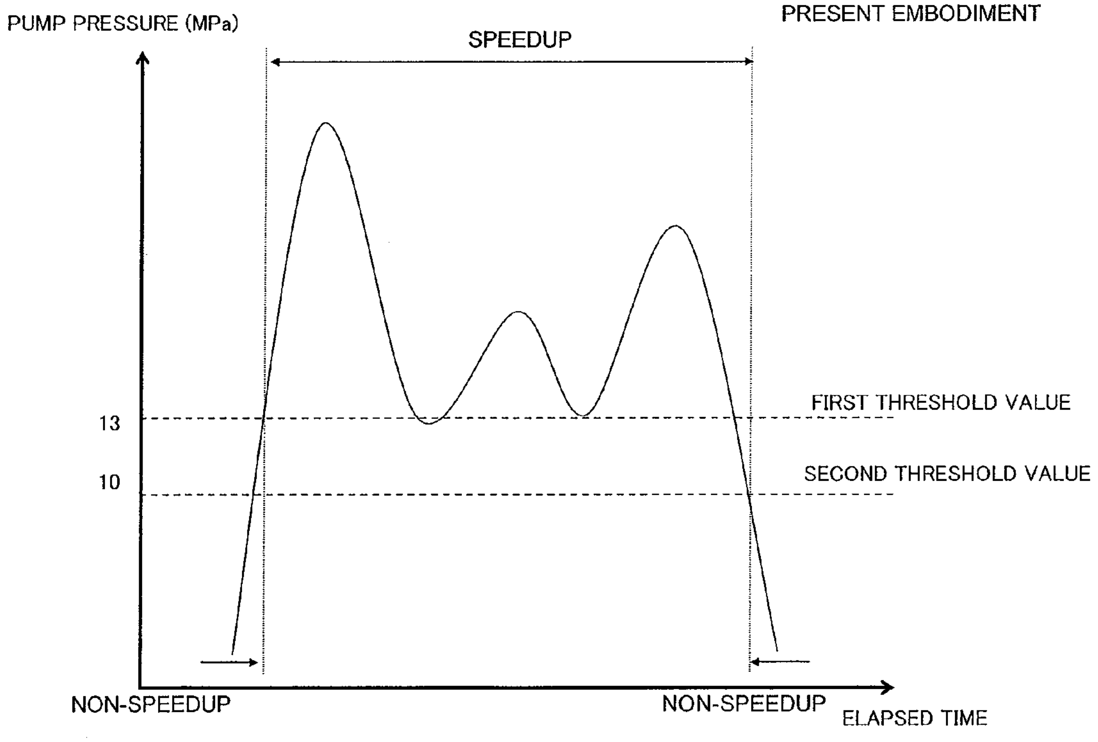
FIG. 5B is a diagram illustrating the relationship between pump pressure changes PD and speedup that prevails during the use of an embodiment of the present invention (first advantage).

FIG. 5B is a diagram illustrating the relationship between speedup and changes in the pump pressure PD that prevails during the use of the present embodiment. The excavation state identification function 62 according to the present embodiment judges, in accordance with the directions of operations of the control levers 43, 44, their operation amounts (ARC, BOU, and BKC), and the pump pressures PD of the hydraulic pumps 2, 3, whether an excavation state prevails. In contrast to the related art, which merely detects whether the control levers are operated or not, the present embodiment detects the operation amounts of the control levers as well. At the beginning of excavation work, the arm crowding operation amount ARC is equivalent to a full operation and either a combined operation of arm crowding and boom raising or a combined operation of arm crowding and bucket crowding is performed. During continued excavation work, the arm crowding operation amount ARC is a value equivalent to a half operation or greater. Detecting the operation amounts makes it possible to judge with increased certainty whether the excavation state prevails.

The present embodiment makes it possible to distinguish between excavation work and non-excavation work with higher certainty than the related art. Therefore, even when the first and second threshold values are set to be lower than when the related art is used, the present embodiment provides the same degree of safety as the related art due to trade-off. In other words, the first and second threshold values can be set to be lower than those used with the related art while safety is assured. For example, the first threshold value is set at 13 MPa in the present embodiment although it is set at 20 MPa in the related art, and the second threshold value is set at 10 MPa in the present embodiment although it is set at 17 MPa in the related art.

A first advantage of the present embodiment will now be described.

Changes in the pump pressure PD indicated in FIG. 5B are the same as changes in the pump pressure PD indicated in FIG. 5A. The non-speedup sequence is followed while the pump pressure PD is lower than 13 MPa. When the pump pressure PD is 13 MPa or higher, the speedup sequence begins and then continues for a while. When the pump pressure PD drops below 10 MPa, the speedup sequence terminates. As described above, the prime mover revolution speed control system according to the present embodiment provides improved operational performance because it constantly follows the speedup sequence during excavation work. Providing improved operational performance increases the operator's concentration, thereby enhancing the effect of work efficiency improvement based on speedup.

A second advantage of the present embodiment will now be described.

Figure 6A:
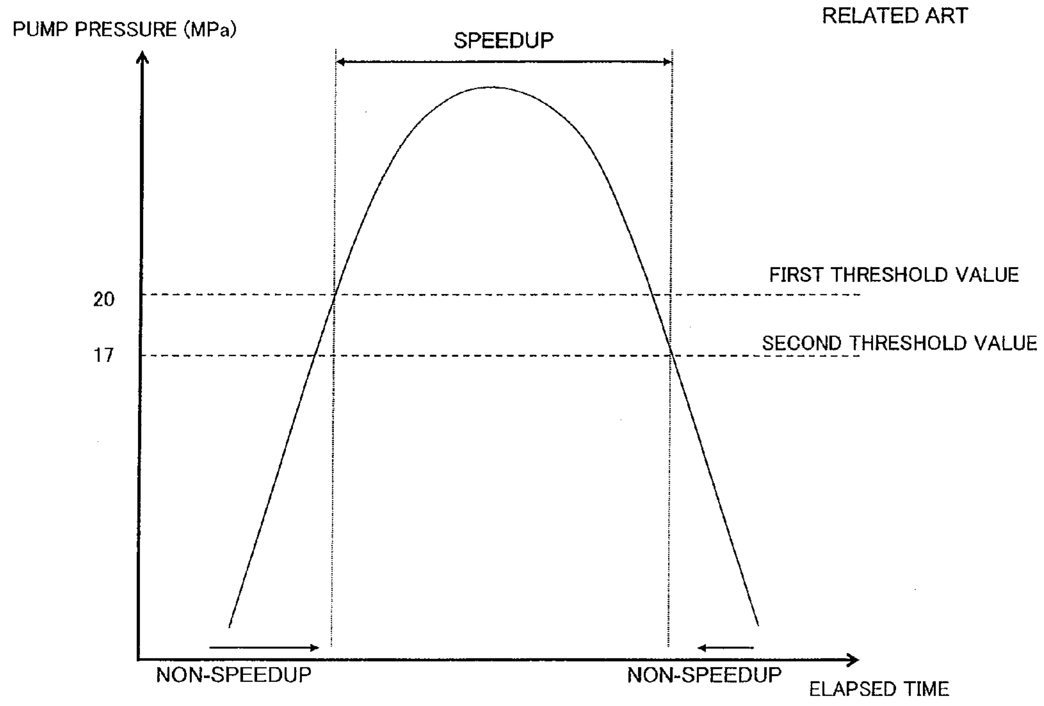
FIG. 6A is a diagram illustrating the relationship between pump pressure changes PD and speedup that prevails during the use of the related art.

FIG. 6A is a diagram illustrating the relationship between speedup and changes in the pump pressure PD that prevails during the use of the related art. The pump pressure PD indicated in FIG. 6A is stabler than the pump pressure PD indicated in FIG. 5A. In this instance, operational performance problems are not likely to become evident.

However, the first and second threshold values are set to be relatively high. Therefore, the speedup sequence begins in the middle of excavation (speedup control does not readily start) and terminates during excavation (speedup control readily becomes ineffective). Consequently, the effect of work efficiency enhancement based on speedup cannot be fully obtained.

Figure 6B:
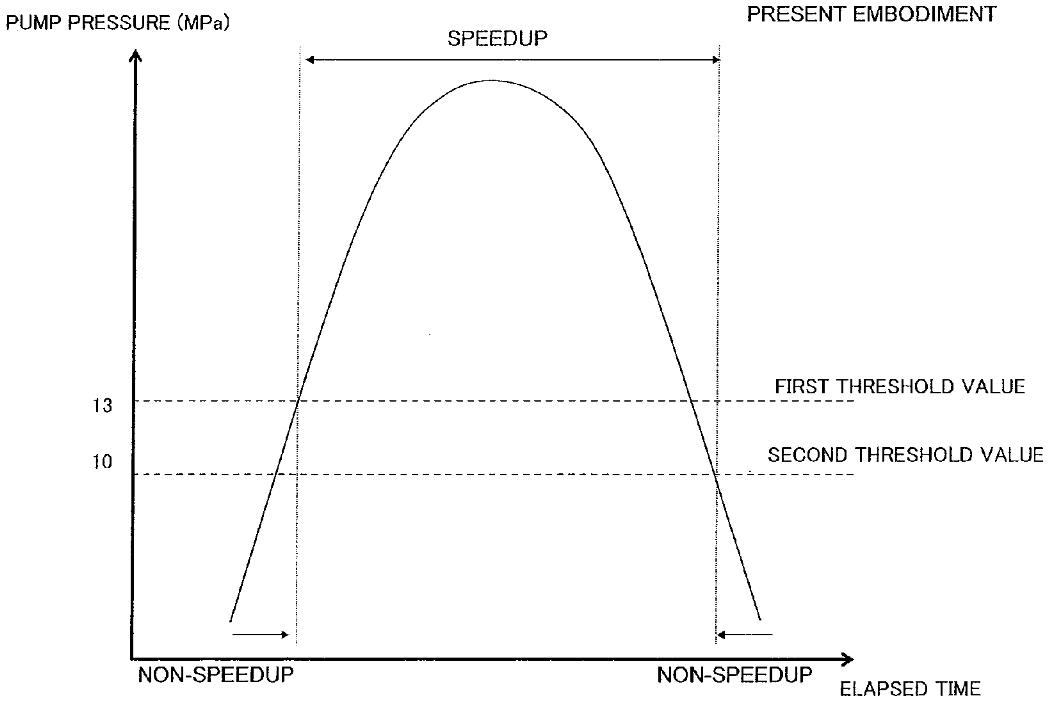
FIG. 6B is a diagram illustrating the relationship between pump pressure changes PD and speedup that prevails during the use of the embodiment of the present invention (second advantage).

FIG. 6B is a diagram illustrating the relationship between speedup and changes in the pump pressure PD that prevails during the use of the present embodiment. The changes in the pump pressure PD indicated in FIG. 6B are the same as the changes in the pump pressure PD indicated in FIG. 6A.

In the present embodiment, the first and second threshold values can be set to be lower than in the related art. Therefore, the present embodiment initiates the speedup sequence at the beginning of excavation (speedup control readily starts) and terminates the speedup sequence at the end of excavation (speedup control does not readily become ineffective). It means that the speedup sequence persists in the present embodiment for a longer period than in the related art.

The concept of speedup sequence period is substituted by the concept of speedup range and appended to FIG. 1. A dotted arc represents the range of speedup provided by the related art, and a solid arc represents the range of speedup sequence provided by the present embodiment. When the related art is used, the speedup sequence begins in the middle of excavation and terminates during excavation. Consequently, the range of speedup is narrow so that the effect of work efficiency enhancement based on speedup cannot be fully obtained. When, on the other hand, the present embodiment is used, the speedup sequence starts at the beginning of excavation and terminates at the end of excavation. Consequently, the range of speedup is wider than the related art so that the effect of work efficiency enhancement based on speedup can be fully obtained. In other words, the present embodiment makes it possible to provide enhanced work efficiency.

What is claimed is:

1. A prime mover revolution speed control system for a hydraulic construction machine, the prime mover revolution speed control system comprising:

a prime mover;

at least one variable-displacement hydraulic pump that is driven by the prime mover;

a plurality of hydraulic actuators that are driven by hydraulic fluid of the hydraulic pump;

a plurality of control valves that control the flow rate and flow direction of the hydraulic fluid delivered from the hydraulic pump to the hydraulic actuators;

operating command means, that is provided for each of the hydraulic actuators, for issuing operating commands for the hydraulic actuators in accordance with the amount of operation in each operation direction by driving the control valves on an individual basis;

operating command detection means for detecting the operating commands of the operating command means;

pump pressure detection means for detecting the pressure of the hydraulic pump;

standard target revolution speed setup means for setting a standard target revolution speed for the prime mover;

target revolution speed correction means for acquiring a target revolution speed for the prime mover by adding a predetermined correction value to the standard target revolution speed in accordance with an operating state invoked by the operating command means; and excavation state identification means for judging, in accordance with the operation direction, the operation amount, and the pump pressure, whether an excavation state prevails;

wherein the excavation state identification means comprises, with reference to the operation direction, the operation amount, and the pump pressure, first judgment conditions used when a result of a last judgment does not indicate that an excavation state prevails, and second judgment conditions, different from the first judgment conditions, used when the result of the last judgment indicates that the excavation state prevails, and the excavation state identification means is configured to judge whether or not the excavation state prevails in the last judgment, and to conclude that the excavation state prevails by using the first judgment conditions when the excavation state does not prevail in the last judgment and to conclude that the excavation state prevails by using the second judgment conditions when the excavation state prevails in the last judgment; and wherein, when the excavation state identification means concludes that an excavation state prevails, the target revolution speed correction means adds the predetermined correction value to the standard target revolution speed.

2. The prime mover revolution speed control system according to claim 1, wherein the first judgment conditions are that the pump pressure is a value equivalent to a predetermined first threshold value or greater, an arm crowding operation amount is a value equivalent to a full operation or greater, and at least either a boom raising operation amount or a bucket crowding amount is a minimum operation amount or greater, and the second judgment conditions are that the pump pressure is a value equivalent to a second threshold value, which is lower than the first threshold value, or greater and the arm crowding operation amount is a value equivalent to a half operation or greater, wherein, if, in a situation where the result of the last judgment does not indicate that an excavation state prevails, first judgment conditions are met the excavation state identification means concludes that the excavation state has begun;

wherein, if, in a situation where the result of the last judgment does not indicate that the excavation state prevails, the first judgment conditions are not met, the excavation state identification means concludes that a non-excavation state has persisted;

wherein, if, in a situation where the result of the last judgment indicates that the excavation state prevails, second judgment conditions are met the excavation state identification means concludes that the excavation state has persisted; and wherein, if, in a situation where the result of the last judgment indicates that the excavation state prevails, the second judgment conditions are not met, the excavation state identification means concludes that the excavation state has terminated.

3. The prime mover revolution speed control system according to claim 1, wherein the excavation state identification means sets respective threshold values of the operation amount and the pump pressure in the second judgment conditions lesser than respective threshold values of the operation amount and the pump pressure set for the first judgment conditions.

4. A prime mover revolution speed control system for a hydraulic construction machine, the prime mover revolution speed control system comprising:

a prime mover;

at least one variable-displacement hydraulic pump that is driven by the prime mover;

a plurality of hydraulic actuators that are driven by hydraulic fluid of the hydraulic pump;

a plurality of control valves that control the flow rate and flow direction of the hydraulic fluid delivered from the hydraulic pump to the hydraulic actuators;

operating command means, that is provided for each of the hydraulic actuators, for issuing operating commands for the hydraulic actuators in accordance with the amount of operation in each operation direction by driving the control valves on an individual basis;

operating command detection means for detecting the operating commands of the operating command means;

pump pressure detection means for detecting the pressure of the hydraulic pump;

standard target revolution speed setup means for setting a standard target revolution speed for the prime mover;

target revolution speed correction means for acquiring a target revolution speed for the prime mover by adding a predetermined correction value to the standard target revolution speed in accordance with an operating state invoked by the operating command means; and excavation state identification means for judging, in accordance with the operation direction, the operation amount, and the pump pressure, whether an excavation state prevails;

wherein, when the excavation state identification means concludes that an excavation state prevails, the target revolution speed correction means adds the predetermined correction value to the standard target revolution speed, wherein, if, in a situation where the result of a last judgment does not indicate that an excavation state prevails, first judgment conditions are met as the pump pressure is a predetermined first threshold value or greater, an arm crowding operation amount is a value equivalent to a full operation or greater, and at least either a boom raising operation amount or a bucket crowding amount is a minimum operation amount or greater, the excavation state identification means concludes that the excavation state has begun;

wherein, if, in a situation where the result of the last judgment does not indicate that the excavation state prevails, the first judgment conditions are not met, the excavation state identification means concludes that a non-excavation state has persisted;

wherein, if, in a situation where the result of the last judgment indicates that the excavation state prevails, second judgment conditions are met as the pump pressure is a second threshold value or greater, which is lower than the first threshold value, and the arm crowding operation amount is a value equivalent to a half operation or greater, the excavation state identification means concludes that the excavation state has persisted; and wherein, if, in a situation where the result of the last judgment indicates that the excavation state prevails, the second judgment conditions are not met, the excavation state identification means concludes that the excavation state has terminated.

* * * * *